United States Patent [19]

Keane et al.

[11] Patent Number: 5,481,710
[45] Date of Patent: Jan. 2, 1996

[54] METHOD OF AND SYSTEM FOR PROVIDING APPLICATION PROGRAMS WITH AN UNDO/REDO FUNCTION

[75] Inventors: Patrick J. Keane, Grapevine; Kathy P. Mitchell, Trophy Club, both of Tex.

[73] Assignee: International Business Machines Corporation, Armonk, N.Y.

[21] Appl. No.: 947,677

[22] Filed: Sep. 16, 1992

[51] Int. Cl.⁶ .................................................. G06F 9/06
[52] U.S. Cl. ............................... 395/700; 364/DIG. 1; 364/286
[58] Field of Search ....................................... 395/650, 700

[56] References Cited

U.S. PATENT DOCUMENTS

| | | | |
|---|---|---|---|
| 4,723,211 | 2/1988 | Barker et al. | 364/DIG. 2 |
| 4,815,029 | 3/1989 | Barker et al. | 364/DIG. 2 |
| 4,878,167 | 10/1989 | Kapulka et al. | 364/DIG. 1 |
| 5,095,421 | 3/1992 | Freund | 395/650 |
| 5,170,480 | 12/1992 | Mohan et al. | 364/DIG. 1 |
| 5,173,854 | 12/1992 | Kaufman et al. | 364/DIG. 2 |

*Primary Examiner*—Thomas M. Heckler
*Attorney, Agent, or Firm*—Jonathan F. Jobe; Duke W. Yee; Andrew J. Dillon

[57] ABSTRACT

A reusable isolated undo/redo service provides application programs with an undo/redo function. Each application that will use the service is registered. Whenever a registered application performs an action that can be undone, it forms a packet and gives the packet to the service. Whenever the user of a registered application wishes to undo or redo an action, the undo or redo processing is performed by the service.

11 Claims, 4 Drawing Sheets

METHOD OF AND SYSTEM FOR PROVIDING APPLICATION PROGRAMS WITH AN UNDO/REDO FUNCTION

BACKGROUND OF THE INVENTION

1. Field of the Invention

The present invention relates generally to computer systems and more particularly to a computer system that includes a reusable isolated undo/redo service that provides application programs with an undo/redo function.

2. Description of the Prior Art

The undo and redo functions are available in many of the products available on the market today. The undo function should be able to reverse actions that the user has decided should not have been performed. The redo function simply reverses the action that was undone most recently. To accomplish this, both functions must save information that would otherwise be lost so that it may be recovered upon user request. For example, to undo a delete, the data that was deleted must be saved. Similarly, to redo a paste, the data that was "unpasted" must be saved so that it may be pasted back. Some applications allow users to undo more than just the last action. This capability is usually called multi-level undo. Given the myriad of applications and the variety of data they support, it has proven extremely difficult to implement the undo function in such a way that it provides a clean interface into a wide variety of applications. As a result, this function is often tightly integrated into each individual application and is not reusable from one application to another without major modification.

SUMMARY OF THE INVENTION

In the present invention, an undo/redo service is established in the computer system. Application programs are registered with the undo/redo service and whenever an application program processes an action that can be undone, the application builds and gives to the undo/redo service a packet that contains at least the identity of the object or objects acted upon by the action and instructions that, when applied to the object or objects, will cause the action to be undone, and instructions that, when applied to the object or objects, will cause the action to be redone. In the preferred embodiment, the packet includes in addition to the identity of the object acted upon, the text for the undo/redo menu item for the action, and the instructions for causing the action to be undone or redone are in the form of code blocks that, when applied to the object or objects of the packet, will cause the action to be undone or redone, respectively. The undo/redo service establishes, in the preferred embodiment, an undo stack and a redo stack for each registered application. The registered application is not aware that stacks are used to manage its packets. In fact, any number of data structure could be used "under the covers."

After the registered application has given a packet to the undo/redo service, the application's responsibility for the undo function is finished. When an undo or redo is requested, the application is not required to do anything. Instead, the processing is performed by an independent undo/redo service that is totally separate from the application. In an object oriented programming language, this can be handled quite nicely by a superclass of all applications that handles common behavior.

In operation, whenever an application processes an action that may be undone, the application builds a packet and gives it to the undo/redo service. Whenever the undo/redo service receives a packet from a registered application, it puts the packet on the undo stack and clears the redo stack. In the preferred embodiment, applications include a menu that includes undo and redo actions. Whenever the user invokes the menu, the undo service provides information to the application. More specifically, the undo/redo service returns to the application the text from the top packet of each stack. If a stack is empty, the service returns nil. The application then enables the undo or redo item with the text returned from the undo/redo service or disables the undo or redo item if the undo service returns nil. Whenever the user of the application selects the undo item, the service pops the top packet from the undo stack, executes the packet's undo code block, and pushes the packet on the redo stack. Similarly, whenever the user selects the redo item, the service pops the top packet from the redo stack, executes the packets redo code block, and pushes the packet on the undo stack. Thus, the service can provide either single-level or multi-level undo and redo functions for any registered application.

DESCRIPTION OF THE PREFERRED EMBODIMENT

Figure 1:
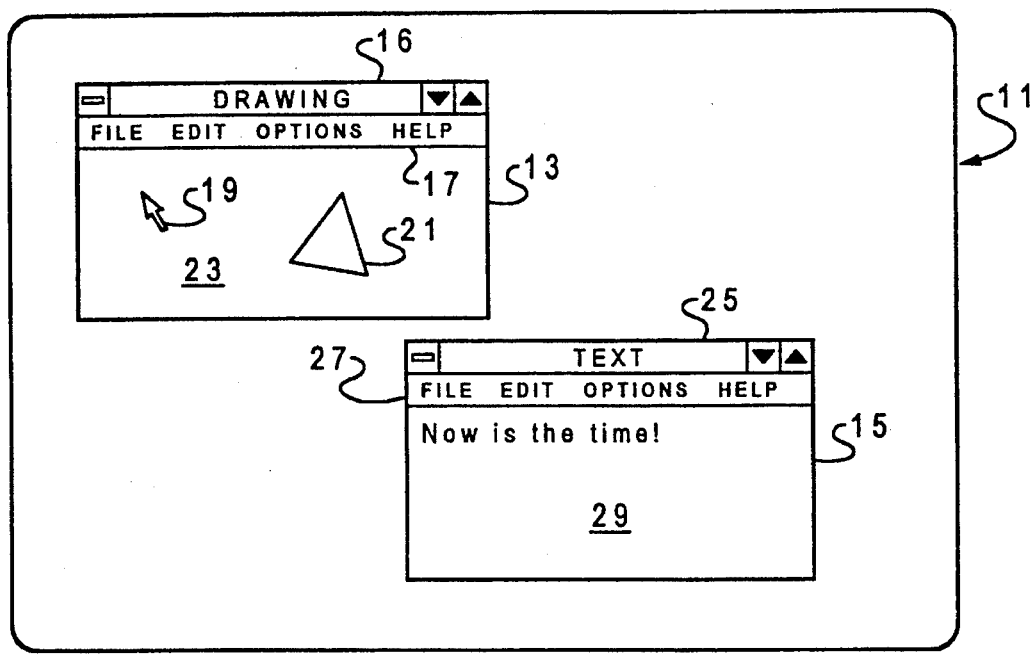
FIG. 1 is a pictorial view of a computer screen with two windows displayed thereon.

Referring now to the drawings, and first to FIG. 1, a computer system display screen is designated generally by the numeral 11. Display screen 11 has displayed therein a window 13, which represents a drawing program, and a window 15, which represents a text editor application. Window 13 includes a title bar 16, which identifies the window as being part of a drawing application. Window 13 also includes a menu bar 17, which includes actions that can be performed by the application of window 13. Each action of window 13 has associated with it a menu that can be pulled down with a pointer 19. As is well known by those skilled in the art, pointer 19 may be moved about screen 11 by means of a mouse (not shown). A triangle 21 is shown in the client area 23 of window 13. Drawing programs, such as the one of window 13, typically give the user the ability to draw figures, such as triangle 21, move them about, rotate them, resize them, color them, and perform other operations, all well known to those skilled in the art.

Window 15 includes a title bar 25, which identifies it as a text editor, and a menu bar 27. Menu bar 27 is similar to menu bar 17 of window 13, and it includes the actions that may be performed by or with the application of window 15. The text editor of window 15 allows the user to enter text, as shown in client area 29 of window 15, and perform various actions upon the text, such as change fonts, delete, move, copy, and perform other operations, all as are well known to those skilled in the art.

Figure 2:
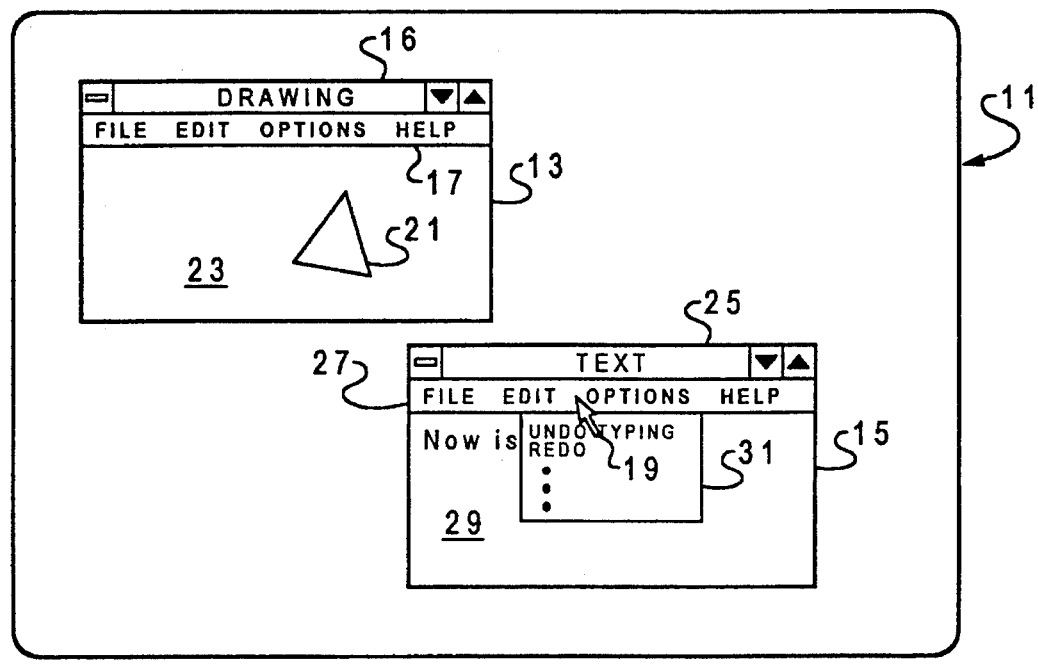
FIG. 2 is a pictorial view similar to FIG. 1 with a pull-down menu displayed in one of the windows.

Referring now to FIG. 2, a pull down menu 31 is shown displayed below the "EDIT" action of menu bar 27. Pull down menu 31 includes an undo item, a redo item, and other items indicated by ellipsis. In the example of FIG. 2, the undo item is enabled since it includes the word "TYPING". The redo item of menu 31 is disabled because, in the example of FIG. 2, at this point, there is nothing to be redone. Selection of the undo item with pointer 19 will cause the text displayed in client area 29 of window 15 to be deleted. If, after selection of the undo item, pull down menu 31 were reopened, the undo item would be disabled and the redo item would be enabled with TYPING. Selection of redo would then result in the text being put back into client area 29.

Figure 3:
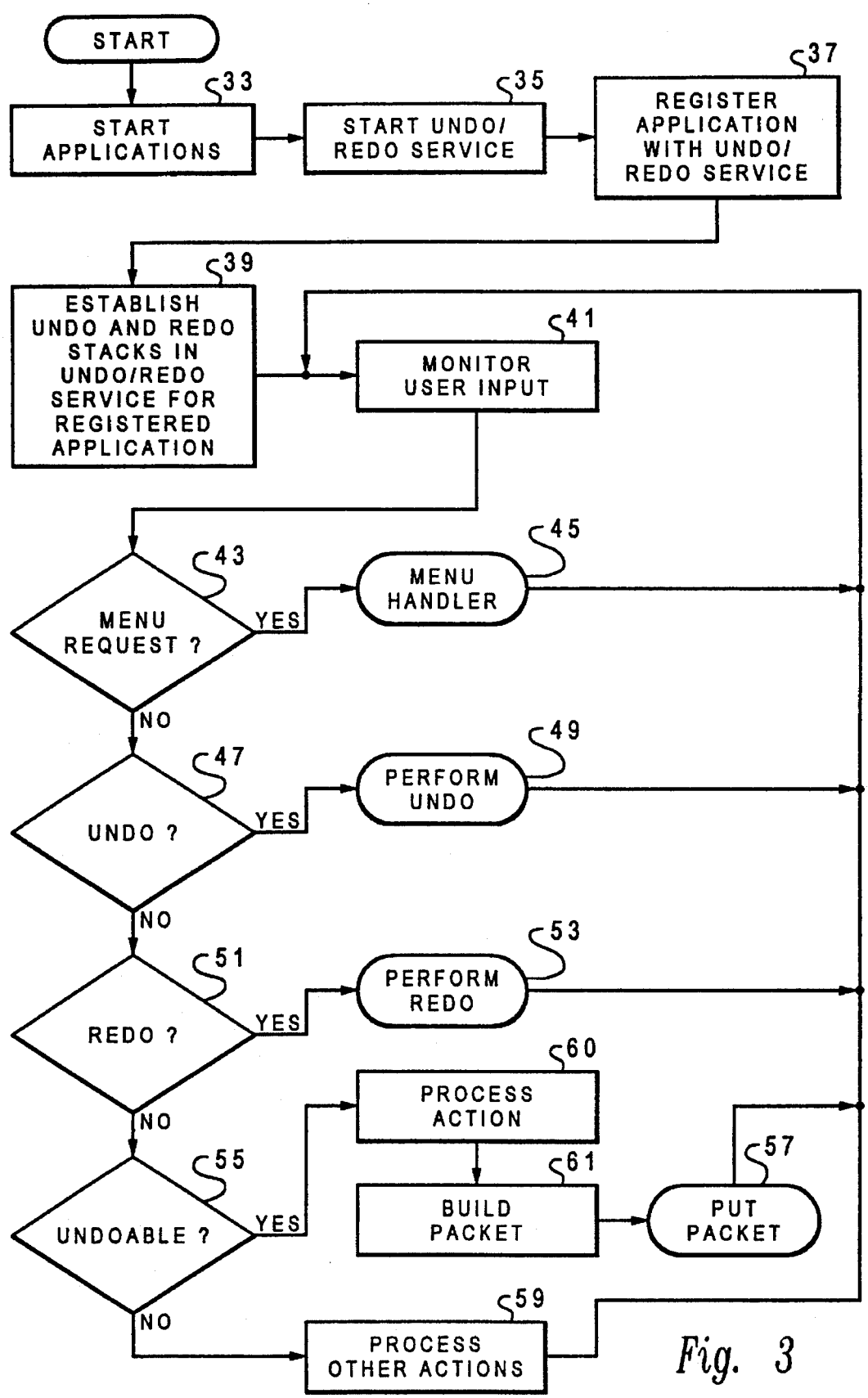
FIG. 3 is a flowchart showing a preferred software implementation of the present invention.

Referring now to FIG. 3, which is a high-level flowchart of a preferred software implementation of the present invention, the applications are started at block 33. The applications include, for example, the drawing application of window 13 and text editor application of window 15 of FIGS. 1 and 2. After the applications have been started, the undo/redo service is started at block 35, if it is not already running. In an object-oriented programming language, a superclass of all applications that handles common behavior could manage the undo/redo service and, thus, a specific "start" is not necessary. Then, at block 37, each application that has the undo and redo functions is registered with the undo/redo service. In the example of FIGS. 1 and 2, both the drawing and text editor applications are registered with the undo/redo service. As each application is registered, the undo/redo service establishes an undo stack and a redo stack for each registered application at block 39. The stack is the preferred data structure for use in the undo/redo service. However, as those skilled in the art will recognize, the undo/redo service could be implemented using queues, lists, or other data structures. At initialization, all of the stacks for the registered applications are empty.

After the applications and undo/redo service have been started and initialized, the application monitors user input at block 41. If, at decision block 43, the user requests a menu, which is illustrated in FIG. 2 by pulling down menu 31, the application executes the menu handler routine, represented generally at block 45. If the user did not request a menu, then the application tests at block 47 whether the user input is the "UNDO" action. An UNDO action is represented by selection of the UNDO item of menu 31 of FIG. 2. If the action is UNDO, then the application tells the undo/redo service to execute the "PERFORM UNDO" routine shown generally at block 49; if not, the application tests at decision block 51 whether the user input is the "REDO" action. If it is, which is represented by selection of the REDO item of menu 31 of FIG. 2, the application tells the undo/redo service to perform the "PERFORM REDO" routine, shown generally at block 53. If the action is not REDO, then the application tests at decision block 55, whether the user-requested action is undoable. The application programmer, when he or she creates the application, defines which actions are undoable. If the action is undoable, then the application processes the action, at block 60, builds a packet, at block 61, and gives the packet to the undo/redo service. The undo service performs the "PUT PACKET" routine, shown generally at block 57. If the action is not undoable, then the application processes the input at block 59 and returns to block 41 to continue monitoring user input. In an object oriented programming language, detecting an UNDO/REDO request and executing the "PERFORM UNDO/REDO" routines can be handled quite nicely by a superclass of all applications that handle common behavior.

Figure 7:
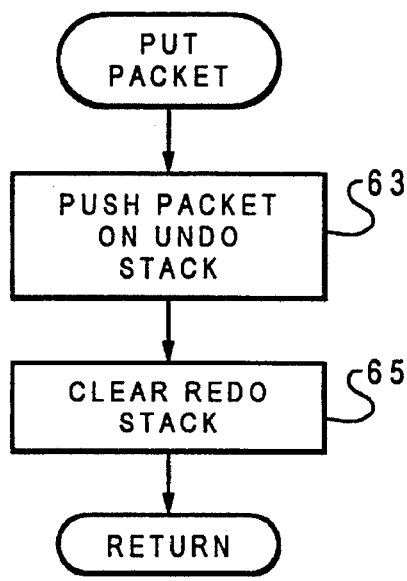
FIG. 7 is a flowchart of a preferred implementation of the PUT PACKET routine of FIG. 3.

A packet comprises the identity of the object or objects acted upon, a text string for use in the menu, the code block which, when applied to the object or objects of the packet, will cause the action to be undone, and the code block which, when applied to the object or objects of the packet, will cause the action to be redone. Referring to FIG. 7, after the packet is built, it is given to the undo/redo service where it is "pushed" or put on top of the undo stack of the service at block 63. Whenever a packet is given to the undo/redo service, the redo stack of the service is cleared, at block 65.

Figure 4:
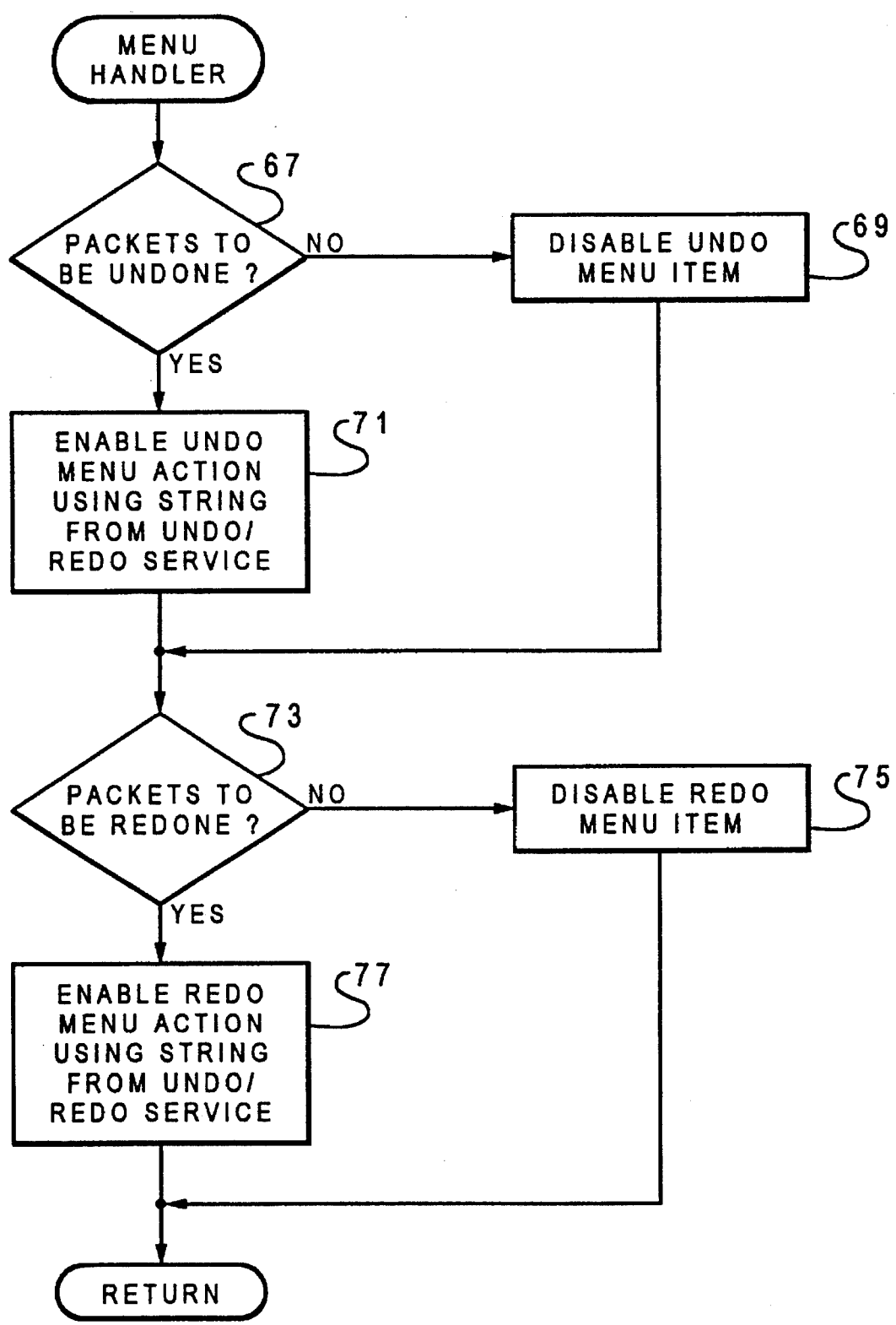
FIG. 4 is a flowchart showing the MENU HANDLER routine of FIG. 3.

Referring now to FIG. 4, there is shown details of the "MENU HANDLER" routine of the present invention, from the perspective of the application. When the user requests a menu (at decision block 43 of FIG. 3) the application inquires of the undo/redo service, at decision block 67, whether there are any packets to be undone. If the undo stack of the undo/redo service for the application is empty, the undo/redo service returns nil and the application disables the undo menu action, e.g. menu 31 of window 15 of FIG. 2, at block 69. If the undo stack is not empty, then the undo/redo service returns the text string from the top packet of the undo stack and the application enables the undo action with the string returned from the undo/redo service, at block 71. Thus, in FIG. 2, menu 31 of window 15 includes "UNDO TYPING", which indicates that the text string from the top packet of the undo stack is "TYPING". Referring again to FIG. 4, after the application has inquired whether there are any actions to undo, the application inquires of the undo/redo service at decision block 73, whether there are any actions to redo. If not, the undo/redo service returns nil and the application disables the redo menu action at, block 75. Typically, whenever a menu action is disabled, it is grayed or otherwise de-emphasized in the user interface so the user knows it is unavailable. If the redo stack is not empty, the undo/redo service returns the text string from the top packet of the redo stack and the application enables the redo action using the string returned from the undo/redo service, at block 77.

Figure 5:
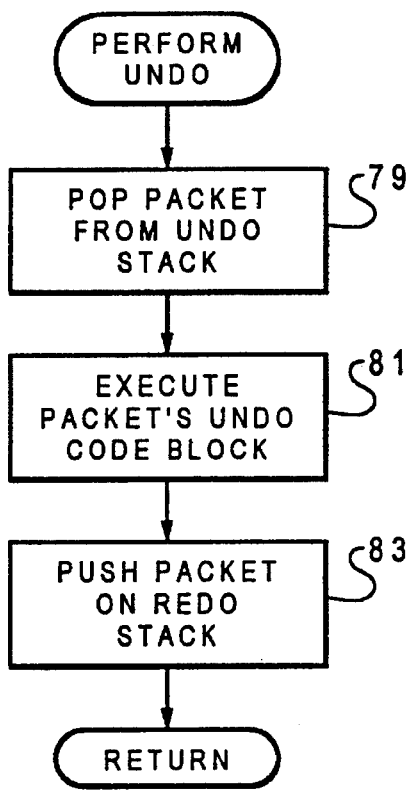
FIG. 5 is a flowchart of a preferred implementation of the PERFORM UNDO routine of FIG. 3.

Referring now to FIG. 5, whenever the user requests the UNDO action (at decision block 47 of FIG. 3), the undo/redo service pops the top packet from the undo stack at block 79. Then the service executes that packet's undo code block at block 81. Again, the code block, when applied to the object or objects of the packet, will cause the action to be undone. More generally, the service invokes the application's undo or redo routines for specific functions so that the service can execute those routines on the application. A code block is a familiar construct in object-oriented programming languages, such as the Smalltalk V (Trademark of Digitalk Inc.) language. The code block is used in the preferred embodiment of the invention; however, the service can also use the address of a function of the application, or a dynamic link library entry point. After the service has executed the packet's undo code block, the packet is pushed on the redo stack, at block 83. Thus, whenever an action is undone, it becomes available to be redone.

Figure 6:
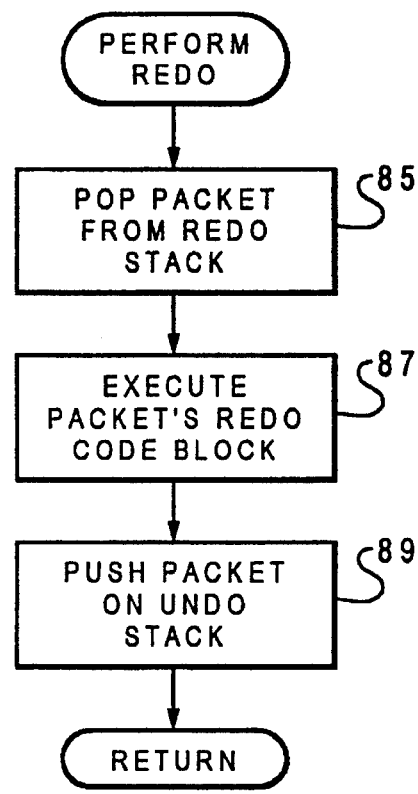
FIG. 6 is a flowchart of a preferred implementation of the PERFORM REDO routine of FIG. 3.

Referring now to FIG. 6, whenever the user requests the REDO action (decision block 51 of FIG. 3), the service pops the top packet from the redo stack at block 85 and executes that packets redo code block at block 87. Then, that packet is pushed on the undo stack at block 89. Thus, whenever an action is redone, it may be undone at a later time.

As will be apparent from the foregoing, the present invention provides single-level or multi-level undo/redo functionality to all registered applications. While the invention has been adequately shown and described, a better understanding of the invention may be obtained by referring to the following examples.

As a first example, consider a drawing program, such as that shown in window 13 of FIGS. 1 and 2. Assume that the user first creates a triangle, then resizes the triangle to a user specified size, and then fills the resized triangle with a user specified color. The undo stack of the undo/redo service would appear according to the following table:

TABLE I

| UNDO STACK |
| --- |
| TOP |
| object(s): triangle (including position, size, color, etc.) |
| text: "triangle fill" |
| undo code block: restores triangle to original fill color |
| redo code block: resizes triangle to user specified color |
| object(s): triangle (including position, size, color, etc.) |
| text: "triangle resize" |
| undo code block: restores triangle to original fill size |
| redo code block: resizes triangle to user specified size |
| object(s): triangle (including position, size, color, etc.) |
| text: "triangle creation" |
| undo code block: destroys the triangle (destroys object) |
| redo code block: builds the triangle (creates object) |
| BOTTOM |

If the user desired to unfill the color from the triangle, he or she would open the edit menu which would include the item "UNDO triangle fill". Selection of the undo item would result in execution of the undo code block, which would restore the triangle to its original fill color, and move the top packet from the undo stack to the redo stack. Then, if the user were to open the edit menu for the drawing application, he or she would be presented with the items "UNDO triangle resize" and "REDO triangle fill".

As a second example, consider a text editor of the type shown in window 15 of FIGS. 1 and 2. Assume that the user first types some text, then changes the font for some selected portion of text to a user specified font, and then deletes the text. The undo stack would appear according to the following Table:

TABLE II

| UNDO STACK |
| --- |
| TOP |
| object(s): text (including position, font, color, etc.) |
| text: "deletion" |
| undo code block: restores text at position (creates object) |
| redo code block: deletes text from position (destroys object) |
| object(s): text (including position, font, color, etc.) |
| text: "font change" |
| undo code block: restores text's font to original |
| redo code block: changes text's font to original |
| object(s): text (including position, font, color, etc.) |
| text: "typing" |
| undo code block: deletes text from position (destroys object) |
| redo code block: restores text at position (creates object) |
| BOTTOM |

If the user desired to undo the deletion of text, he or she would open the edit menu which would contain the item "UNDO deletion". Selection of that "UNDO deletion" item would cause the undo/redo service to execute the undo code block, which would restore the deleted text and would move the top packet from the undo stack to the top of the redo stack. If the user again opened the edit menu, it would contain an "UNDO font change" item and a "REDO deletion" item.

From the foregoing, it may be seen that the present invention provides a reasonable, isolated undo/redo service that is available for all registered application programs in the system. The service reduces the complexity of the application programs and simplifies their creation. While the invention has been particularly shown and described with reference to a preferred embodiment, those skilled in the art will understand that various changes may be made in form and detail without departing from the spirit and scope of the invention.

What is claimed is:

1. A method of providing application programs in a computer system with an undo/redo function, which comprises the computer implemented steps of:

establishing an undo/redo service in said computer system;

establishing an undo data structure and a redo data structure in said undo/redo service;

registering a selected application program among a plurality of application programs within said computer system with said undo/redo service;

giving a packet to said undo/redo service whenever said selected application program processes an action on an object that can be undone, said packet including the identity of the object acted upon by said action, instructions that, when applied to the object of the packet, will cause the action to be undone, and a text string for a menu choice for said action; and placing said packet in said undo data structure.

2. The method as claimed in claim 1 including the computer implemented steps of:

displaying a menu in response to user input, said menu including an undo action;

inquiring of said undo/redo service whether there are any actions to be undone;

returning to said selected application, in response to said inquiry, the text string from the last received of said undo data structure whenever said undo data structure has at least one packet in it;

enabling said undo action with said text string in response to return of said string from said undo/redo service;

returning to said selected application, in response to said inquiry, nil whenever said undo data structure is empty; and disabling said undo action in response to return of nil from said undo/redo service.

3. The method as claimed in claim 2, including the computer implemented steps of:

removing the last received packet from said undo data structure and executing said packet's undo instructions in response to user selection of said undo action.

4. The method as claimed in claim 3, including the computer implemented step of:

placing the packet removed from said undo data structure on said redo data structure in response to user selection of said undo action.

5. The method as claimed in claim 1, wherein said packet includes instructions that, when applied to the object of the packet, will cause the action to be undone.

6. The method as claimed in claim 1, including the computer implemented step of:

executing instructions within a last received packet for said selected application in said undo/redo service in response to user input, thereby to undo said action.

7. A method of providing application programs in a computer system with an undo/redo function, which comprises the computer implemented steps of:

establishing an undo/redo service in said computer system;

registering a selected application program among a plurality of application programs within said computer system with said undo/redo service;

establishing at least an undo stack in said undo/redo service for said selected application; and placing a packet on said undo/redo stack whenever said selected application program processes an action that can be undone, said packet containing (a) the identity of the object acted upon by the action, (b) a text string for a menu choice for said action, (c) a code block that, when applied to the object of the packet, will cause the action to be undone, and (d) a code block that, when applied to the object of the packet, will cause the action to be redone.

8. The method as claimed in claim 7 including the steps of:

displaying a menu in response to user input, said menu including an undo action;

inquiring of said undo/redo service whether there are any actions to be undone;

returning to said selected application, in response to said inquiry, the text string from the top packet of said undo stack whenever said undo stack has at least one packet on it;

enabling said undo action with said text string in response to return of said string from said undo/redo service;

returning to said selected application, in response to said inquiry, nil whenever said undo stack is empty; and disabling said undo action in response to return of nil from said undo/redo service.

9. The method as claimed in claim 8, including the steps of:

removing the topmost packet from said undo stack and executing said packet's undo code block in response to user selection of said undo action.

10. The method as claimed in claim 9, including the steps of:

establishing a redo stack in said undo/redo service for said selected application; and placing the packet removed from said undo stack on said redo stack in response to user selection of said undo action.

11. The method as claimed in claim 7, including the steps of:

establishing a redo stack in said undo/redo service for said registered selected application; and, moving the topmost packet from said undo stack to said redo stack whenever the action of said topmost packet is undone.

* * * * *